US012046192B2

(12) United States Patent
Jacobson et al.

(10) Patent No.: US 12,046,192 B2
(45) Date of Patent: Jul. 23, 2024

(54) ADAPTIVE SUBSAMPLING FOR DEMURA CORRECTIONS

(71) Applicant: QUALCOMM Incorporated, San Diego, CA (US)

(72) Inventors: Natan Jacobson, San Diego, CA (US); Daniel Stan, Thornhill (CA); Ike Ikizyan, San Diego, CA (US); Mark Sternberg, Toronto (CA); Timothy David Tang, San Diego, CA (US); Yan Li, Shanghai (CN); Xinchao Yang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/034,664

(22) PCT Filed: Dec. 29, 2020

(86) PCT No.: PCT/CN2020/140650

§ 371 (c)(1),
(2) Date: Apr. 28, 2023

(87) PCT Pub. No.: WO2022/141022

PCT Pub. Date: Jul. 7, 2022

(65) Prior Publication Data

US 2024/0013713 A1 Jan. 11, 2024

(51) Int. Cl.
*G09G 3/3208* (2016.01)
*G09G 3/00* (2006.01)
*G09G 3/20* (2006.01)

(52) U.S. Cl.
CPC ........... *G09G 3/3208* (2013.01); *G09G 3/006* (2013.01); *G09G 3/2074* (2013.01); *G09G 2320/0233* (2013.01); *G09G 2360/16* (2013.01)

(58) Field of Classification Search
CPC .... G09G 3/3208; G09G 3/006; G09G 3/2074; G09G 2320/0233; G09G 2360/16; G09G 2320/0285
See application file for complete search history.

(56) References Cited

U.S. PATENT DOCUMENTS 6,260,038 B1 * 7/2001 Martin .................. G06F 16/285 707/999.005
2014/0009484 A1 * 1/2014 Suyama ................ G06T 11/001 345/589

(Continued)

FOREIGN PATENT DOCUMENTS

CN 103562987 A 2/2014
CN 104821157 A 8/2015

(Continued)

OTHER PUBLICATIONS

International Search Report and Written Opinion—PCT/CN2020/140650—ISA/EPO—Oct. 9, 2021.

*Primary Examiner* — Md Saiful A Siddiqui
(74) *Attorney, Agent, or Firm* — QUALCOMM Incorporated

(57) ABSTRACT

The present disclosure relates to methods and devices for display processing including an apparatus, e.g., a DPU. The apparatus may receive a plurality of panel measurements for a display panel, each of the plurality of panel measurements associated with a plurality of subpixels in the display panel. The apparatus may also determine, upon receiving the plurality of panel measurements, at least one offset for one or more subpixels of the plurality of subpixels associated with each of the plurality of panel measurements. The apparatus may also store, upon determining the at least one offset for the one or more subpixels, the at least one offset (Continued)

for the one or more subpixels associated with each of the plurality of panel measurements.

31 Claims, 9 Drawing Sheets

(56) References Cited

U.S. PATENT DOCUMENTS

| | | | | |
|---|---|---|---|---|
| 2015/0187328 | A1* | 7/2015 | Kim | G09G 3/3225 345/83 |
| 2018/0047368 | A1* | 2/2018 | Luo | G09G 3/20 |
| 2018/0158173 | A1* | 6/2018 | Gao | G06T 7/0002 |
| 2018/0342224 | A1 | 11/2018 | Beon et al. | |
| 2019/0132591 | A1* | 5/2019 | Zhang | H04N 19/59 |
| 2021/0134221 | A1* | 5/2021 | Berget | G09G 5/395 |
| 2021/0150965 | A1* | 5/2021 | Zhang | G09G 3/3208 |
| 2021/0201758 | A1* | 7/2021 | Pyo | G09G 5/10 |
| 2021/0210007 | A1* | 7/2021 | Stan | G09G 3/20 |
| 2022/0165201 | A1* | 5/2022 | Park | G09G 3/2007 |
| 2022/0198977 | A1* | 6/2022 | Kim | G09G 3/20 |

FOREIGN PATENT DOCUMENTS

| | | | |
|---|---|---|---|
| CN | 106328030 | A | 1/2017 |
| CN | 107408367 | A | 11/2017 |
| CN | 108257557 | A | 7/2018 |
| CN | 109863549 | A | 6/2019 |
| CN | 110337685 | A | 10/2019 |
| CN | 110580885 | A | 12/2019 |
| CN | 111383566 | A | 7/2020 |
| WO | 2019171340 | A1 | 9/2019 |
| WO | 2020066456 | A1 | 4/2020 |

* cited by examiner

ADAPTIVE SUBSAMPLING FOR DEMURA CORRECTIONS

CROSS REFERENCE TO RELATED APPLICATION(S)

This application is a National Stage Application filed under 35 U.S.C. § 371 of PCT International Application No. PCT/CN2020/140650, entitled "METHODS AND APPARATUS FOR ADAPTIVE SUBSAMPLING FOR DEMURA CORRECTIONS" and filed Dec. 29, 2020, which is expressly incorporated by reference herein in its entirety.

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processing unit (DPU) or any apparatus that can perform display processing. The apparatus may receive a plurality of panel measurements for a display panel, each of the plurality of panel measurements associated with a plurality of subpixels in the display panel. The apparatus may also identify the one or more subpixels of the plurality of subpixels associated with each of the plurality of panel measurements. The apparatus may also determine, upon receiving the plurality of panel measurements, at least one offset for one or more subpixels of the plurality of subpixels associated with each of the plurality of panel measurements. Additionally, the apparatus may select the at least offset from the plurality of offset types, where the plurality of offset types corresponds to a plurality of partition types for the one or more subpixels. The apparatus may also store, upon determining the at least one offset for the one or more subpixels, the at least one offset for the one or more subpixels associated with each of the plurality of panel measurements. The apparatus may also apply, upon determining the at least one offset for the one or more subpixels, a clustering algorithm to each of the at least one offset for the one or more subpixels. Moreover, the apparatus may compress, upon determining the at least one offset for the one or more subpixels, the at least one offset for the one or more subpixels associated with each of the plurality of panel measurements. The apparatus may also generate, upon determining the at least one offset for the one or more subpixels, a codebook based on the at least one offset for the one or more subpixels.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
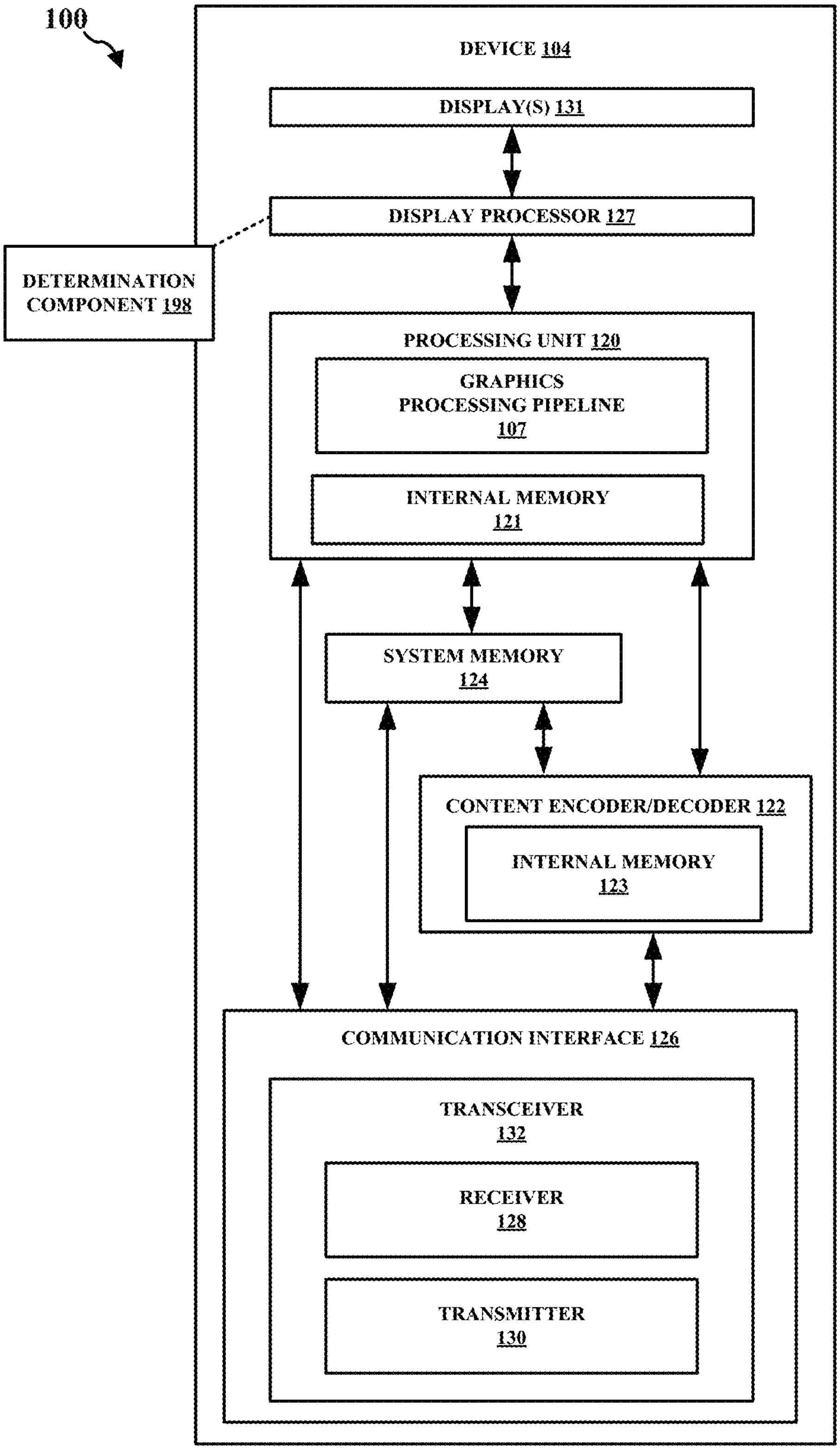
FIG. 1 is a block diagram that illustrates an example content generation system in accordance with one or more techniques of this disclosure.

Each pixel or subpixel on a display panel can be measured for a variety of test patterns. In some aspects, the test patterns may include a number of constant images at different levels. This data can then be fed to an algorithm, which can compute an optimal demura offset for each subpixel at each level. These demura offsets can be utilized to improve the brightness uniformity of each subpixel. In some instances, the bandwidth necessary to store this demura offset data may be large. In order to reduce the data size of the demura offsets, a machine-learning technique known as clustering, e.g., via the use of clustering algorithms, may be utilized. Different displays may use a number of different subpixel formats depending on the display type and manufacturer. As display resolutions increase, visually lossless display stream compression may be utilized more frequently to reduce transmission link bandwidth. Some system topologies that utilize a display stream compression codec may include information entropy of the correction surface. Aspects of the present disclosure may reduce information entropy of the correction surface for system topologies that utilize certain codecs, e.g., a display stream compression (DSC) codec. Aspects of the present disclosure may also mitigate compression artifacts of a correction surface for display stream compression codecs. For instance, aspects of the present disclosure may provide for a method for calculating demura corrections on a subsampled block or grid, which has the effect of reducing the information entropy of the correction surface.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term “content” may refer to “graphical content,” “image,” and vice versa. This is true regardless of whether the terms are being used as an adjective, noun, or other parts of speech. In some examples, as used herein, the term “graphical content” may refer to a content produced by one or more processes of a graphics processing pipeline. In some examples, as used herein, the term “graphical content” may refer to a content produced by a processing unit configured to perform graphics processing. In some examples, as used herein, the term “graphical content” may refer to a content produced by a graphics processing unit.

In some examples, as used herein, the term “display content” may refer to content generated by a processing unit configured to perform displaying processing. In some examples, as used herein, the term “display content” may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term “non-transitory” may indicate that the storage medium is not embodied in a carrier wave or a propagated signal. However, the term “non-transitory” should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a determination component 198 configured to receive a plurality of panel measurements for a display panel, each of the plurality of panel measurements associated with a plurality of subpixels in the display panel. The determination component 198 may also be configured to identify the one or more subpixels of the plurality of subpixels associated with each of the plurality of panel measurements. The determination component 198 may also be configured to determine, upon receiving the plurality of panel measurements, at least one offset for one or more subpixels of the plurality of subpixels associated with each of the plurality of panel measurements. The determination component 198 may also be configured to select the at least offset from the plurality of offset types, where the plurality of offset types corresponds to a plurality of partition types for the one or more subpixels. The determination component 198 may also be configured to store, upon determining the at least one offset for the one or more subpixels, the at least one offset for the one or more subpixels associated with each of the plurality of panel measurements. The determination component 198 may also be configured to apply, upon determining the at least one offset for the one or more subpixels, a clustering algorithm to each of the at least one offset for the one or more subpixels. The determination component 198 may also be configured to compress, upon determining the at least one offset for the one or more subpixels, the at least one offset for the one or more subpixels associated with each of the plurality of panel measurements. The determination component 198 may also be configured to generate, upon determining the at least one offset for the one or more subpixels, a codebook based on the at least one offset for the one or more subpixels. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
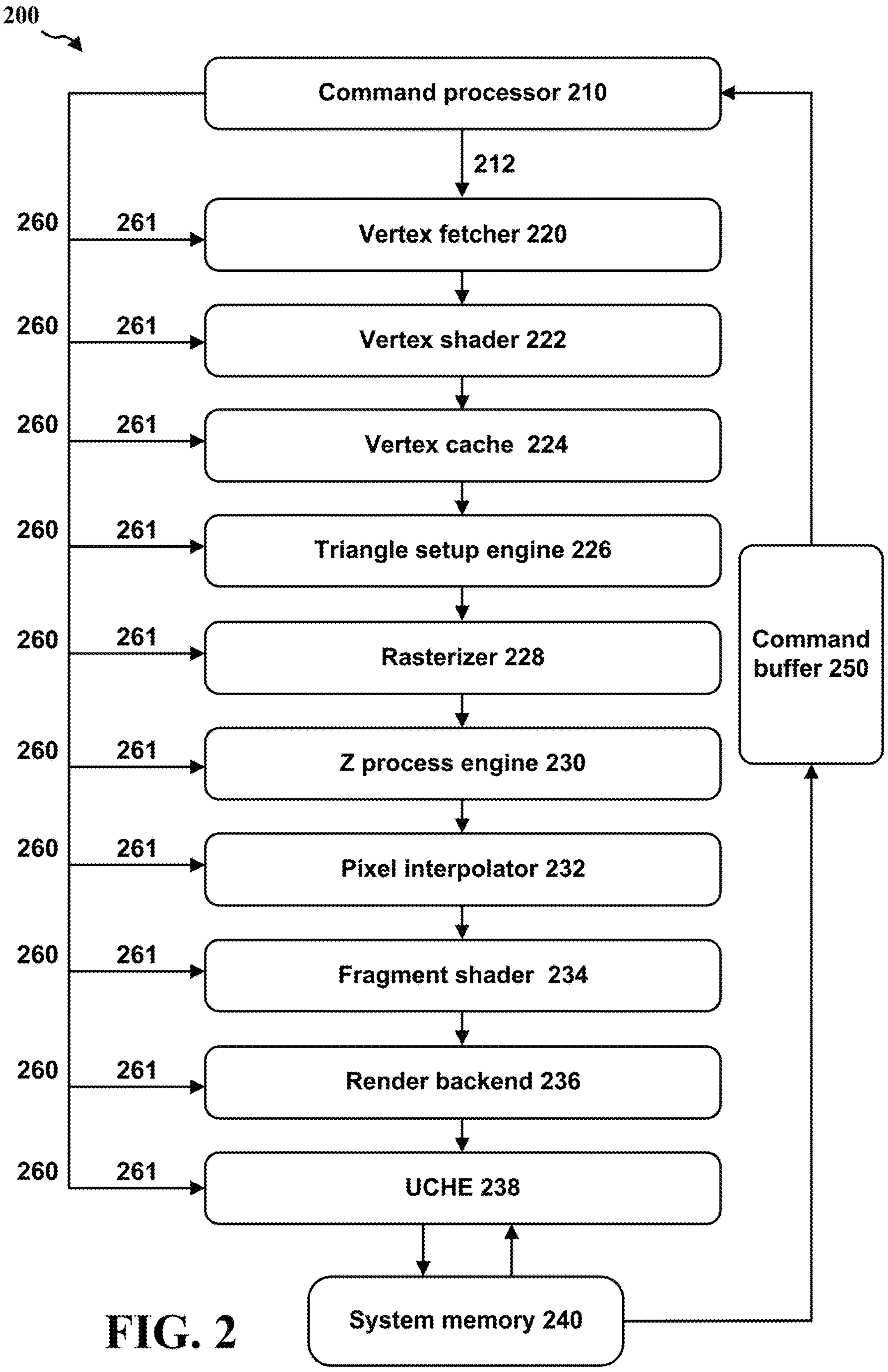
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Aspects of mobile devices or smart phones can utilize buffer mechanisms to distribute or coordinate a buffer between an application rendering side of the device, e.g., a GPU or CPU, and a display or composition side of the device, e.g., a display engine. For instance, some mobile devices can utilize a buffer queue mechanism to distribute or coordinate a buffer between an application rendering side and a display or composition side, which can include an application processor (AP) or buffer compositor, e.g., a hardware composer (HWC). In some aspects, the application rendering side can be referred to as a producer, while the display or composition side can be referred to as a consumer. Additionally, a synchronization divider or fence can be used to synchronize content between the application rendering side and the display or composition side. Accordingly, a fence can be referred to as a synchronization divider, and vice versa.

A variety of factors can be performance indicators for display processing between an application rendering side and a display or composition side. For instance, frames per second (FPS) and janks, i.e., delays or pauses in frame rendering or composition, can be performance indicators. In some aspects, a jank can be a perceptible pause in the rendering of a software application's user interface. In some applications, janks can be the result of a number of factors, such as slow operations or poor interface design. In some instances, a jank can also correspond to a change in the refresh rate of the display at the device. Janks can also impact a user experience.

In some instances, applications can run at a variety of different FPS modes. In some aspects, displays can run at 30 FPS mode. In other aspects, applications can run at different FPS modes, e.g., 20 or 60 FPS. Aspects of the present disclosure can include a current frame latency time, which can refer to the time difference between when a previous frame completes rendering a current frame completes rendering. The frame latency time can also refer to the time between successive refreshing frames. The frame latency time can also be based on a frame rate. For instance, the frame latency time for each frame can be 33.33 ms (e.g., corresponding to 30 FPS), 16.67 ms (e.g., corresponding to 60 FPS), or 50 ms (e.g., corresponding to 20 FPS).

The market share for displays or panels utilizing organic light emitting diodes (OLEDs) has been steadily increasing. For instance, an increasing amount of OLED displays are being used in high-tier smartphones or smart devices, as well as mid-tier smartphones or even low-tier smartphones. This increasing OLED popularity is due to a number of different reasons, such as OLED's excellent color gamut and near-infinite contrast ratio. However, OLED panels may utilize significantly more display processing when compared with liquid crystal display (LCD) panels due to non-uniformities in the OLED materials and/or the manufacturing process. These non-uniformities can be referred to as "mura." These non-uniformities can also be corrected in a process known as "demura."

Demura processes can increase the luminance uniformity of OLED panels, as each pixel in an OLED panel may not be the same brightness or luminance when compared to other pixels. For instance, in demura processes, each pixel or subpixel can be measured for its brightness. Then the pixels or subpixels can be corrected to make the pixels a uniform brightness level. As such, demura processes can increase the panel uniformity in OLED panels. In some instances, demura solutions can be integrated into the panel display driver integrated circuit (IC) (DDIC). These DDICs can power the display panel. DDIC based demura solutions can have a number of different components. For example, DDIC based solutions may utilize flash memory on the DDIC to store any demura corrections. This can increase the amount of components or parts utilized by the device or panel, especially compared to storing demura corrections on a system memory. In turn, the cost for the bill of materials (BOM) can increase, as the amount of components utilized by the DDIC and the BOM cost can be directly correlated.

Additionally, DDIC-based demura solutions may transmit or send fully sampled image data to the DDIC. By doing so, DDIC-based solutions may utilize a larger amount of display bandwidth compared to other demura solutions. Further, frame buffer specifications for display stream compression (DSC) or video electronics standards association (VESA) display compression-M (VDC-M) may be larger due to compression ratios. For example, a process node for a DDIC may be a certain amount, e.g., 28 nm or higher, at the same time an AP is using another process amount, e.g., a 7 nm process. This can also increase the BOM cost and/or reduce performance levels.

Figure 3:
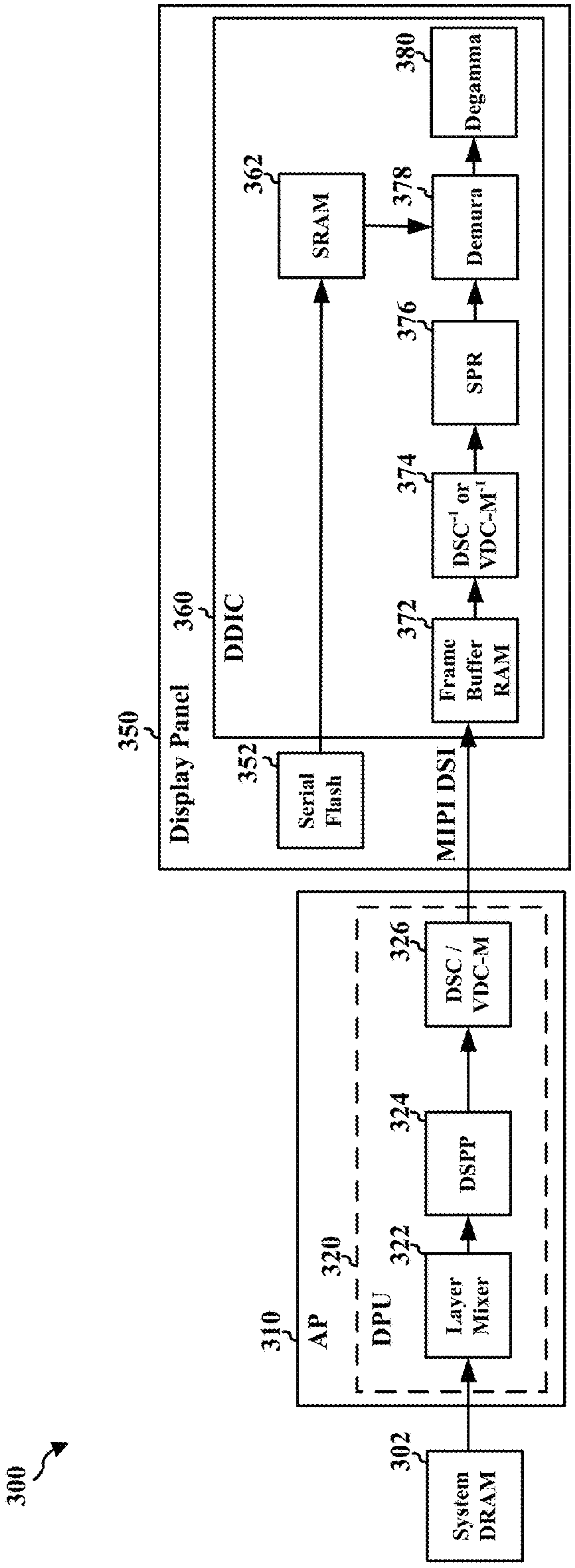
FIG. 3 illustrates an example system architecture in accordance with one or more techniques of this disclosure.

FIG. 3 illustrates system architecture 300 in accordance with one or more techniques of this disclosure. As shown in FIG. 3, system architecture 300 includes system dynamic random access memory (DRAM) 302, application processor (AP) 310, display processing unit (DPU) 320 including layer mixer 322, destination surface processor pipes (DSPP) 324, and display stream compression (DSC) or VDC-M encoder 326. System architecture 300 also includes display panel 350, serial flash memory 352, DDIC 360 including static RAM (SRAM) 362, frame buffer RAM 372, $DSC^{-1}$ or $VDC\text{-}M^{-1}$ decoder 374, subpixel rendering (SPR) unit 376, demura unit 378, and degamma unit 380.

As shown in FIG. 3, system DRAM 302 may send data or communicate with layer mixer 322, which can communicate data to DSPP 324. Also, DSPP 324 can communicate with DSC or VDC-M encoder 326. In turn, DSC or VDC-M encoder 326 can communicate data, e.g., mobile industry processor interface (MIPI) display serial interface (DSI) data, to a frame buffer on a decoder side (frame buffer RAM) 372. Additionally, frame buffer RAM 372 can communicate with $DSC^{-1}$ or $VDC\text{-}M^{-1}$ decoder 374, which can communicate with SPR unit 376. SPR unit 376 can communicate data to demura unit 378, which can communicate with degamma unit 380. Moreover, serial flash memory 352 can communicate with SRAM 362, and SRAM 362 can communicate with demura unit 378. FIG. 3 displays that system architecture 300 can include a large amount of components or parts utilized by the AP 310 and display panel 350. Accordingly, the BOM cost for system architecture 300 can be large compared to other types of demura solutions. As indicated above, system architecture 300 can utilize a DDIC-based demura architecture.

As indicated above, DDIC-based demura solutions may utilize a high BOM cost, as well as utilize a high amount of power, e.g., compared to AP-based demura solutions. For example, storing data or information at the memory on the DDIC can result in an increased number of components at the device, as well as an increased BOM cost. Aspects of the present disclosure can include demura architectures and solutions that utilize an application processor (AP). AP-based demura solutions according to the present disclosure can have a number of advantages compared to DDIC-based solutions. For instance, by moving the demura process to the AP, aspects of the present disclosure can reduce the amount of BOM cost and/or reduce the amount of power utilized by the demura process. Further, demura processes of the present disclosure can increase the performance level of devices.

Aspects of the present disclosure can also include a method for calculating and compressing correction factors or correction offsets for an AP-based demura solution. By doing so, the BOM cost can be reduced, e.g., by storing corrections in a system memory, for the AP-based solution. Additionally, in AP-based demura solutions of the present disclosure, SPR rendered data can be utilized. By transmitting SPR data, aspects of the present disclosure can include a corresponding reduction in display bandwidth, e.g., a 33% reduction in display bandwidth. Additionally, aspects of the present disclosure can utilize higher compression ratios to further ease frame buffer specifications, e.g., for DSC or VDC-M display stream compression. AP-based demura solutions can also reduce the BOM cost and increase display performance based on the process node of the AP. For example, the process node of the AP can be smaller, e.g., 7 nm, compared to a DDIC's process node, e.g., 28 nm or higher.

Figure 4:
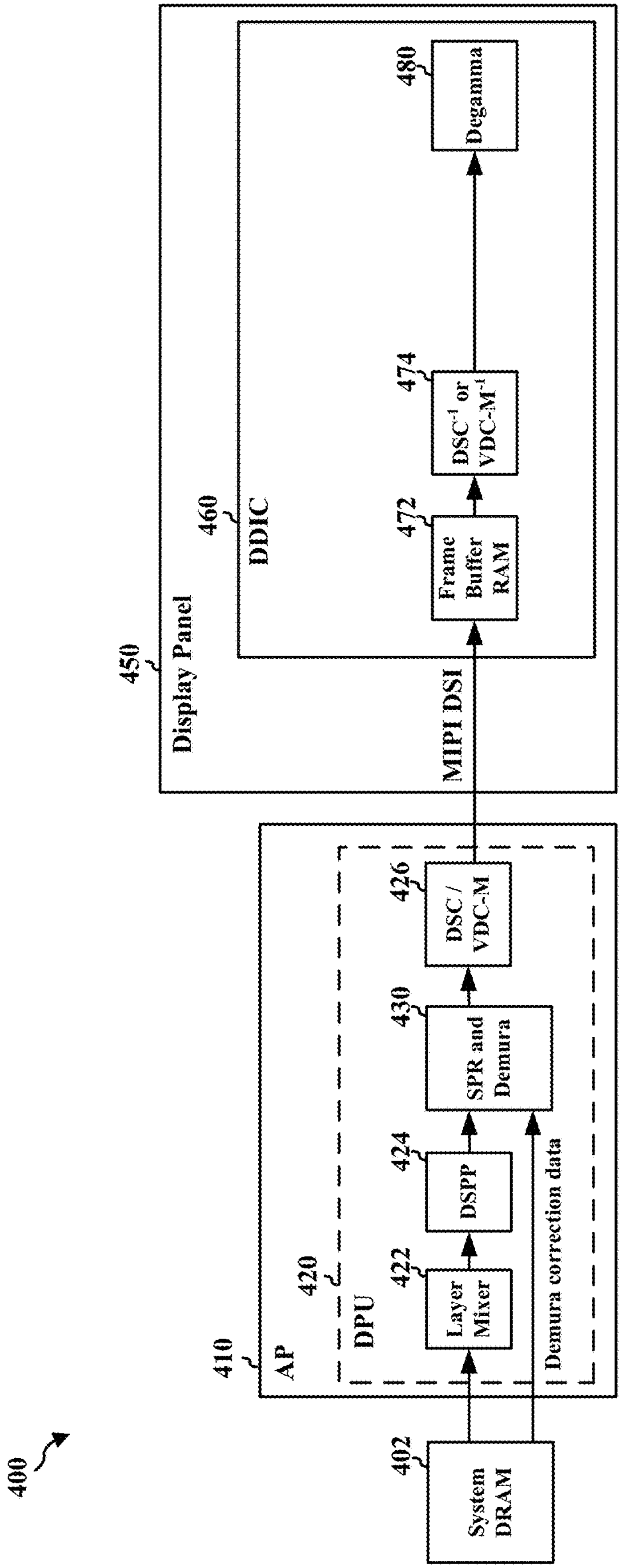
FIG. 4 illustrates an example system architecture in accordance with one or more techniques of this disclosure.

FIG. 4 illustrates system architecture 400 in accordance with one or more techniques of this disclosure. As shown in FIG. 4, system architecture 400 includes system DRAM 402, AP 410, DPU 420 including layer mixer 422, DSPP 424, DSC or VDC-M encoder 426, and SPR and demura unit 430. System architecture 400 also includes display panel 450 and DDIC 460 including frame buffer RAM 472, $DSC^{-1}$ or $VDC\text{-}M^{-1}$ decoder 474, and degamma unit 480. As shown in FIG. 4, system DRAM 402 may send data or communicate with layer mixer 422, which can communicate with DSPP 424. DSPP 424 can communicate data with SPR and demura unit 430, which can communicate with DSC or VDC-M encoder 426. In turn, DSC or VDC-M encoder 426 can communicate data, e.g., MIPI DSI data, to frame buffer RAM 472. In some aspects, the DSC or VDC-M encoder 426 can communicate a compressed bit stream, e.g., a ⅔ sampled SPR compressed bit stream. Additionally, frame buffer RAM 472 can communicate with $DSC^{-1}$ or $VDC\text{-}M^{-1}$ decoder 474, which can communicate with degamma unit 480.

FIG. 4 displays that system architecture 400 can include a reduced amount of components or parts utilized by the AP 410 and display panel 450, as compared to system architecture 300 in FIG. 3. Accordingly, the BOM cost for system architecture 400 can be reduced compared to system architecture 300 or other DDIC-based demura architecture. As shown in FIG. 4 system architecture 400 can utilize an AP-based demura architecture. As compared to system architecture 300 in FIG. 3, system architecture 400 in FIG. 4 can remove a number of components. For example, compared to system architecture 300, system architecture 400 removes the serial flash memory 352 and the SRAM 362. Further, system architecture 400 combines the SPR unit 376 and the demura unit 378 into SPR and demura unit 430. As indicated above, reducing the amount of components in system architecture 400 can result in a corresponding reduction in BOM cost.

In addition to reducing the BOM cost, system architecture 400 can reduce the amount of system power utilized. For example, compared to the system architecture 300 in FIG. 3 above, the system architecture 400 in FIG. 4 can reduce both the system power and the BOM cost. For instance, system architecture 400 reduces the amount of memory utilized at the DDIC, e.g., DDIC 460, and can move it to the AP, e.g., AP 410. Also, system architecture 400 can reduce the amount of data transferred between the AP 410 or DPU 420 and the display panel 450 or DDIC 460.

In some aspects, system architecture 400 can store a number of correction factors or correction offsets at the AP 410. By doing so, this can reduce power utilized at the DDIC 460. Additionally, the logic of applying the correction factors or correction offsets can be performed on the AP 410, which can also save power due to the smaller process node utilized by the AP. As shown in FIG. 4, demura processes according to the present disclosure can also measure the display panel using a measurement system. For example, the measurement system may be a camera, an imaging photometer, or an imaging colorimeter. FIG. 4 also displays that demura correction data can be transferred from the system DRAM 402 to the SPR and demura unit 430.

In some aspects, a set of test patterns can be displayed on the display panel. Also, each subpixel on the display panel can be measured for a variety of test patterns. In some aspects, the test patterns may include a number of constant images at different levels. This data can then be fed to an algorithm, which can compute an optimal demura offset for each subpixel at each level. These demura offsets can be utilized by the present disclosure in order to improve the brightness uniformity of each subpixel. In some instances, the bandwidth necessary to store this demura offset data may be large. In order to reduce the data size of the demura offsets, aspects of the present disclosure can utilize a machine-learning technique known as clustering, e.g., via the use of clustering algorithms.

Different displays may use a number of different subpixel formats depending on the display type and manufacturer. For example, some common subpixel formats are full-stripe red (r), green (G), blue (B) (RGB), diamond PenTile, GGRB, YYG-M, YYG-W, and RGB+white (RGBW). In some aspects, the most relevant subpixel rendering (SPR) format may be a PenTile type. For liquid crystal display (LCD) displays, the most common subpixel format may be "full stripe RGB" in which each display pixel consists of one red, one green, and one blue subpixel. For OLED displays, the complicated circuitry utilized for each subpixel may make full stripe RGB infeasible using current process technology. Also, there may be two main types of subpixel rendering for OLED displays: PenTile-type and delta-type. For PenTile-type displays, the green component may be unaltered, i.e., there is one green subpixel for each pixel in the source image. The red and blue components may be subsampled by a certain factor, e.g., a factor of 2:1, such that there is one red/blue subpixel for each two red/blue pixels in the source image. For delta-type displays, the red, green and blue components may be subsampled by a certain, e.g., a factor of 3:2. Two examples of delta-type displays are YYG-M and YYG-W. Further, an alternative subpixel structure used for LCD displays is RGBW. The addition of the white subpixel in RGBW may allow for a higher display luminance at the expense of color accuracy.

As display resolutions increase, visually lossless display stream compression may be utilized more frequently to reduce transmission link bandwidth. This may be true for low-bandwidth mobile links, e.g., MIPI DSI. As an example, consider a display resolution of 2960×1440 at 24 bits/pixel and 60 frames/second, where the necessary bandwidth for this link is 6.14 Gbit/sec. This may exceed the typical 1 GHz MIPI DSI transmission link capacity of 4 Gbit/sec. However, if display stream compression is used at a rate of 6 bits/pixel, then the necessary bandwidth may become 1.53 Gbit/sec. This may enable a necessary transmission over an existing link. There are two available standards for display stream compression from Video Electronics Standards Association (VESA): display stream compression (DSC) and VESA display compression-M (VDC-M). The VESA DSC codec was standardized in a first VESA codec for display streams. This codec supports visually lossless compression down to a certain number of bits per pixel, e.g., 8 bits/pixel.

In some aspects, a display stream compression codec may include a fixed rate. As such, the codec's performance may be directly related to the entropy of the image being compressed. The higher the entropy, the more distortion may be caused by the codec. Based on the above, it may be beneficial to reduce information entropy of the correction surface for system topologies that utilize a display stream compression codec. It may also be beneficial to mitigate compression artifacts of a correction surface for display stream compression codecs. Moreover, it may be beneficial to calculate demura corrections based on a block or grid of pixels or subpixels.

Aspects of the present disclosure may reduce information entropy of the correction surface for system topologies that utilize certain codecs, e.g., a display stream compression (DSC) codec. Aspects of the present disclosure may also mitigate compression artifacts of a correction surface for display stream compression codecs. For instance, aspects of the present disclosure may provide for a method for calculating demura corrections on a subsampled block or grid of pixels or subpixels, which has the effect of reducing the information entropy of the correction surface. This may be beneficial in certain system topologies which make use of a display stream compression codec. This may also be beneficial for AP-based demura, as the corrections may be embedded in the image domain data transmitted over the display transmission link, e.g., MIPI DSI. Because mura is a high-frequency phenomenon, the demura surface may be high-frequency, which may appear as noise to the DSC codec. In some instances, the corrections may cause visual artifacts due to the subsequent compression artifacts.

In the presence of DSC, it may be beneficial to calculate a demura offset for a block or grid of pixels or subpixels, rather than a single pixel or subpixel. For instance, one advantage of calculating a demura offset for a block of subpixels is that the resulting surface may have a lower entropy and may be easier to compress. In some instances, there may be some precision or granularity lost due to calculating a demura offset for a block or subpixels, rather than a single subpixel. As such, some aspects of the present disclosure may allow for a slight loss in precision or granularity, but a corresponding gain in a reduction of DSC artifacts.

As indicated above, in order to mitigate the aforementioned compression artifacts, aspects of the present disclosure may reduce the entropy of the correction surface by calculating corrections on a subsampled block or grid. For example, a 2×2 subsampled grid may be a good balance between demura performance and reducing the occurrence of DSC artifacts. Moreover, the techniques described herein may be generalized to any M×N grid (e.g., 3×3 grid, 3×2 grid, 2×3 grid, 3×1 grid, 1×3 grid, 1×2 grid, 2×1 grid, etc.), where M is a number of rows and N is a number of columns. To further improve performance, aspects of the present disclosure may implement an adaptive subsampling scheme where the number of correction offsets per block or grid of subpixels, e.g., a 2×2 block, may be calculated dynamically. So a block of subpixels may have a single offset or multiple offsets, e.g., a 2×2 block of subpixels may have 1 offset, 2 offsets, 3 offsets, or 4 offsets. For instance, a higher amount of offsets in a block of subpixels may result in a higher error reduction but an increased entropy.

As indicated herein, aspects of the present disclosure may determine that a group or block of pixels or subpixels in each sample or measurement may include a similar correction factor or offset. For example, aspects of the present disclosure may identify a group or block of subpixels that may include a similar offset. This offset or correction factor may correspond to a correction surface or a demura surface. The correction surface may correspond to an internal representation of the display panel within software. So aspects of the present disclosure may include an internal representation of a display panel based on panel data. As such, for each subpixel in a display panel, aspects of the present disclosure may include a corresponding correction factor or offset.

In some aspects, a measurement of the display panel may correspond to a certain amount of subpixels, such as subpixels at a certain color or a specific level of light. So the amount of subpixels may correspond to a certain color of subpixels or a certain light level of subpixels. Also, each of the panel measurements may include a component or color value, e.g., red (R) green (G), or blue (B), of the subpixels, as well as a color level or gray value of the subpixels. So aspects of the present disclosure may set the subpixels to a certain level and then perform a measurement.

Figure 5:
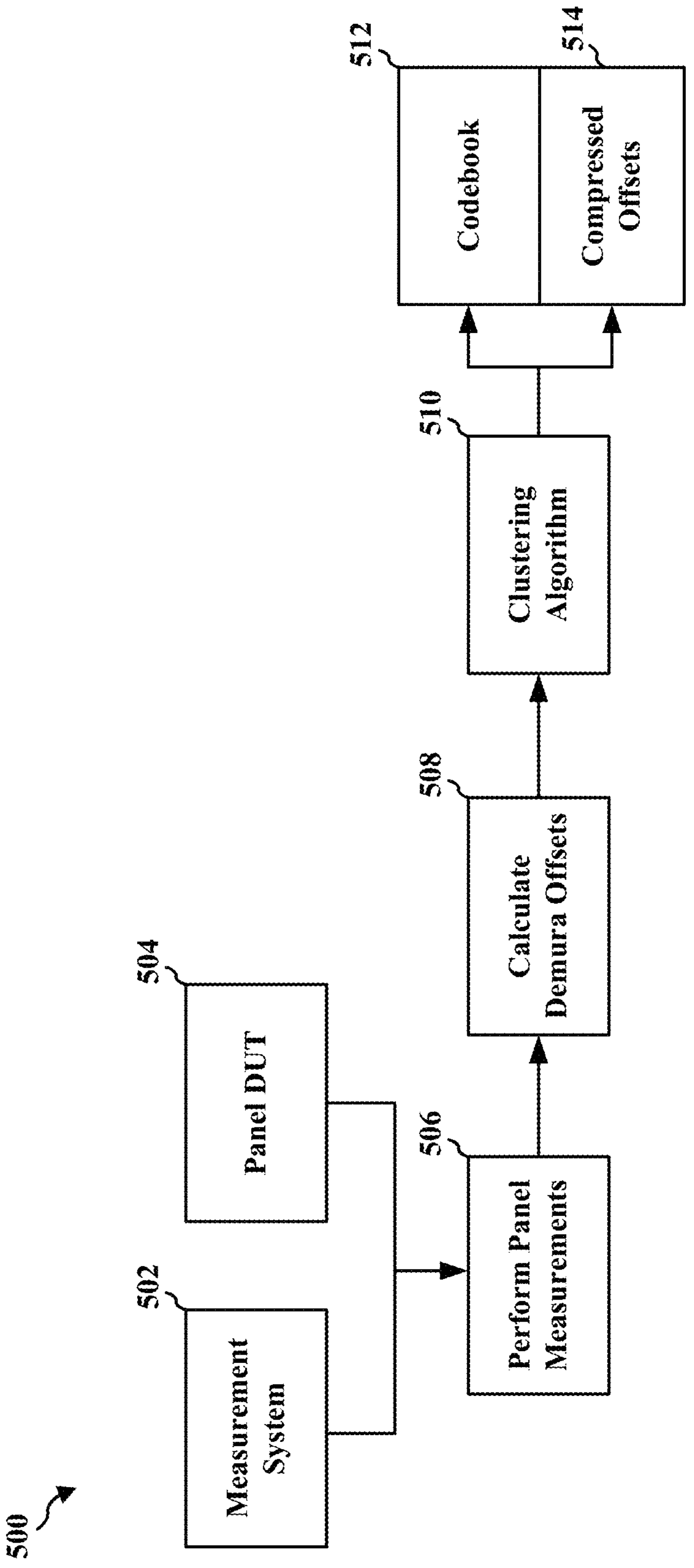
FIG. 5 illustrates an example diagram in accordance with one or more techniques of this disclosure.

FIG. 5 illustrates diagram 500 in accordance with one or more techniques of this disclosure. More specifically, FIG.

5 displays a diagram for the compression of demura offsets, which can be an AP-based demura solution performed on a DPU. As shown in FIG. 5, diagram 500 includes measurement system 502, panel or device under test (DUT) 504, panel measurements 506, demura offsets 508, clustering algorithm 510, codebook 512, and compressed offsets 514. In some aspects, a device under test (DUT), e.g., DUT 504, can be a particular instance of a display panel, e.g., panel 504. As shown in FIG. 5, measurement system 502 can measure panel or DUT 504. This can result in panel measurements 506. In some aspects, the measurement system can be a camera or a demura camera. After this, aspects of the present disclosure can calculate demura offsets 508. Next, aspects of the present disclosure can utilize clustering algorithm 510, which can result in codebook 512 and compressed offsets 514. Aspects of the present disclosure can measure a number of different factors of the display panel. For example, aspects of the present disclosure can measure the panel based on three color levels, e.g., red (R), green (G), and blue (B) (RGB), with a number of bits per color level, e.g., 8 bits. Also, each measurement can include a luminance value, e.g., a luminance value for each pixel or subpixel.

Aspects of the present disclosure can also calculate demura offsets, e.g., demura offsets 508, for each pixel or subpixel. As indicated above, there may be a variation between the luminance level emitted by each pixel or subpixel. If a pixel or subpixel is emitting a high or low luminance level compared to other pixels or subpixels, aspects of the present disclosure can apply an offset to the pixel or subpixel, e.g., demura offsets 508. These offsets can be included in one or more sets of data. Aspects of the present disclosure can also compress the data, e.g., by using clustering algorithm 510. For instance, data can be compressed by quantizing the amount of luminance offset for each pixel or subpixel, such as via a clustering algorithm. This can reduce the amount of bandwidth necessary to perform the demura offset. So in order to reduce the size of the demura offsets, aspects of the present disclosure can leverage a machine-learning technique known as clustering. In some aspects, the clustering algorithm 510 can be a K-means clustering algorithm. K-means is an iterative algorithm which can determine a set of centroids which can represent data. This K-means clustering algorithm can be performed in any dimensionality, and can be referred to as vector quantization when the dimension is larger than a certain size, e.g., larger than two dimensions. In some aspects, the dimensionality can be the number of levels at which the offsets are computed. For example, if there are offsets at eight different levels, then the K-means algorithm can be an 8-dimensional clustering operation. This means that each centroid may also be eight dimensions. Further, by compressing or quantizing this data, aspects of the present disclosure can reduce the amount of power necessary to perform the demura offset.

As shown in FIG. 5, the clustering algorithm 510 can generate two outputs, e.g., a codebook 512 and a set of compressed offsets 514. In some instances, the codebook 512 can be constructed from centroids of the clustering process. For instance, the centroids can include a representation or estimation of the data for each pixel or subpixel. The codebook 512 can also be a type of database. For example, there can be a number of codebooks that include different RGB color information. The compressed offsets 514 can be an index of the centroids of the clustering process, e.g., for each data sample. For example, the index can point to the codebook 512. The compressed offsets 514 can also include different RGB color information. Additionally, the compressed offsets 514 can be a code word. The codebook 512 or compressed offsets 514 can be used to adjust the pixel luminance of a display panel. For instance, the codebook 512 or compressed offsets 514 can be encoded prior to collecting demura correction data for a frame, e.g., for each pixel or subpixel in a frame. Aspects of the present disclosure can also decode or decipher demura correction data for a frame based on the codebook value or the compressed offsets value. As such, the codebook can act as a lookup table for demura correction data for each pixel or subpixel in a frame. Aspects of the present disclosure can also store the decoded correction data for the frame. Additionally, aspects of the present disclosure can reduce an amount of the correction data, e.g., when an ambient light level is greater than an ambient light threshold. In some aspects, the amount of correction data can be reduced based on a device power level or a display brightness level. Moreover, the decoded correction data can be based on display content of the display panel, as well as a color gamut for the display panel.

As shown in FIG. 5, some aspects of correction generation according to the present disclosure may not utilize subsampling. For instance, the step 508 for demura offset calculation in FIG. 5 may be performed for each sample independently. This may produce an ideal correction surface in the absence of display stream compression. However, when DSC is used, the entropy of the correction surface may result in compression artifacts being observed in practice. These compression artifacts may be especially noticeable at a low gray level. In some instances, this may be used in the absence of DSC or when a DSC topology is selected which is optimally aligned with the SPR type, e.g., DSC for PenTile data.

In some aspects, for a given sample or subpixel (s), an offset ($s_B$) may be calculated as follows:

$$s_B = \underset{\alpha\in A}{\operatorname{argmin}}(|T - eval(s, \alpha)|).$$

In this formula, A represents the set of available offsets (e.g., A:={−32, −31, . . . , +31}), T represents the target luminance for the given component/level, e.g., 1 nit, eval represents a fitting function for estimating the luminance of sample of subpixel s with offset α. Also, argmin(f(x)) returns the value of x which minimizes f(x) over the set of candidates for x (as opposed to the minimum value itself). This function may be a polynomial fit, spline fit, or other mapping function. For instance, if there are a number of assigned bits for available offsets, e.g., 6 bits, then the present disclosure can access that amount of bits, e.g., [−32, . . . , +31], for the corresponding amount of available offsets.

As indicated above, aspects of the present disclosure can determine or select the offset from the available offsets for a set of subpixels. Also, for each pixel or subpixel, the present disclosure may determine the predicted luminance for a subpixel and determine the offset that results in the target luminance. As such, the offset may correspond to an absolute difference between a predicted luminance and a target luminance for the subpixel. Based on the above, aspects of the present disclosure can determine or build a model for calculating the offset. The aforementioned formula may return an amount of light for a given offset, i.e., the absolute difference from the target luminance. The offset can correspond to a correction factor. Also, the eval function is a predictive component for a finite number of measurements that may not actually be measured.

Some aspects of correction generation according to the present disclosure may utilize subsampling. To reduce the entropy of the demura correction surface, a single offset may be computed for each M×N block of samples. In some instances, a certain size block of samples, e.g., a 2×2 block of samples, may offer an ideal trade-off between demura resolution and reduction in compression artifacts. The correction surface itself may still correspond to the full resolution, but each block, e.g., 2×2 block, may have the same offset, which may dramatically reduce the entropy and mitigating compression artifacts. In some instances, the distortion for a certain surface, e.g., a 1×1 surface, may be larger than a subsampled surface, e.g., a 2×2 subsampled surface (e.g., 67.64 vs. 74.65).

Aspects of the present disclosure may include a procedure for computing subsampled corrections, e.g., 2×2 subsampled corrections. For instance, for a given block (B) of subpixels, the offset ($s_B$) may be calculated as follows:

$$s_B = \underset{\alpha \in A}{\operatorname{argmin}}\left(\left|T - \frac{1}{4}\sum\nolimits_{\beta \in B}(eval(\beta, \alpha))\right|\right).$$

In this formula, A represents the set of available offsets (e.g., A:={−32, −31, . . . , +31}), B represents the set of samples within a 2×2 block, T represents the target luminance for the given component/level, and eval represent a fitting function for estimating the luminance of sample β with offset α. This function may be a polynomial fit, spline fit, or other mapping function.

Aspects of the present disclosure may utilize dynamic subsampling selected from a predetermined set of partition types for each block. For example, aspects of the present disclosure may utilize dynamic subsampling for computing subsampled corrections, e.g., 2×2 subsampled corrections. The purpose of doing this may be to allow for a middle-ground between the two previous solutions (subsampling disabled and subsampling enabled). This may be necessary in the presence of DSC to trade-off between DSC artifacts (most pronounced with subsampling disabled) and panel uniformity (reduced by enabling subsampling).

Figure 6:
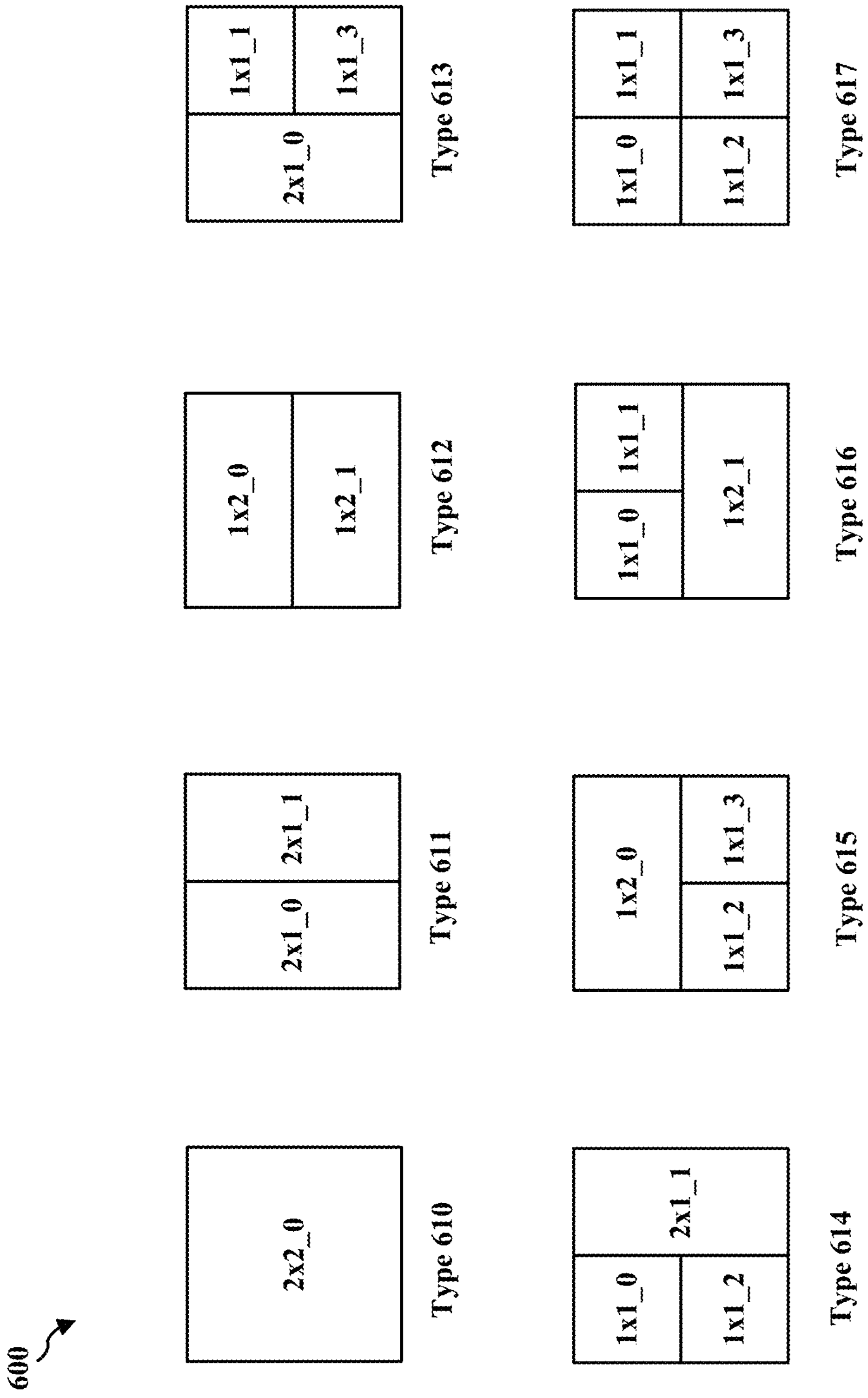
FIG. 6 illustrates an example diagram including partition types for a block of subpixels in accordance with one or more techniques of this disclosure.

FIG. 6 illustrates diagram 600 including partition types for a block of subpixels in accordance with one or more techniques of this disclosure. For instance, diagram 600 includes partition types 610, 611, 612, 613, 614, 615, 616, and 617. As shown in FIG. 6, these partition types may include 2×2 (2×2_0), 2×1 (2×1_0 and 2×1_1), 1×2 (1×2_0 and 1×2_1), and 1×1 (1×1_0, 1×1_1, 1×1_2, and 1×1_3).

As shown in FIG. 6, a 2×2 block may include eight (8) available partition types. The partition types may be constructed from a set of primitives or "sub-blocks" enumerated in FIG. 6. In some aspects, the offset for each sub-block may be calculated in a similar fashion to the 2×2 block, but with a changing number of samples. By using the partitions, aspects of the present disclosure can ensure that the amount of offsets may be fixed, which may help to ensure consistency in the data. Although FIG. 6 shows a 2×2 block of subpixels that includes 8 available partition types, aspects of the present disclosure may include any appropriate size of block, e.g., 1×2, 2×1, 1×3, 3×1, 3×2, 2×3, 3×3, etc., that may include any appropriate number of available partition types.

For a given block or sub-block (B) of subpixels, the offset ($s_B$) may be calculated as follows:

$$s_B = \underset{\alpha \in A}{\operatorname{argmin}}\left(\left|T - \frac{1}{N}\sum\nolimits_{\beta \in B}(eval(\beta, \alpha))\right|\right).$$

In this formula, A represents the set of available offsets (e.g., A:={−32, −31, . . . , +31}), B represents the set of samples within a sub-block, N represents the number of samples within the sub-block, T represents the target luminance for the given component/level, and eval represents a fitting function for estimating the luminance of sample β with offset α. This function may be a polynomial fit, spline fit, or other mapping function.

In some aspects, once the offsets for each sub-block in the block of subpixels have been computed, the partition types may be constructed from their constituent parts. For each partition type, pt, a cost may be determined as follows: cost(pt)=D·(1+penalty[pt]), and $$D = \sqrt{\frac{1}{4}\cdot\sum\nolimits_{\beta \in B}(T - eval(\beta, s_\beta))^2},$$

where $s_\beta$ is the offset for sample β in a given partition type. The distortion, D, measures the variation of the luminance of the four samples around the combined target. The cost equation shows the corresponding cost of the distortion. The penalty term, penalty, corresponds to an increasing penalty for using a higher amount of offsets. So aspects of the present disclosure may disincentivize the use of an increased amount of offsets. This penalty term may be looked-up from a pre-specified look-up table (LUT).

Table 1 below displays example LUTs for a penalty term associated with each partition type. As shown in Table 1 below, LUT A is the most conservative in terms of allowing for a partition type with more than one offset (bias towards 2×2), while LUT D is the least conservative (bias towards 1×1). This trend is further confirmed by the distortion encountered by a DSC model. Finally, the partition type with a minimum cost is selected for the current block.

TABLE 1

| Partition type | LUT A | LUT B | LUT C | LUT D |
|---|---|---|---|---|
| Type 0 | 0.0 | 0.0 | 0.0 | 0.0 |
| Type 1 | 5.0 | 0.5 | 0.25 | 0.15 |
| Type 2 | 10.0 | 1.0 | 0.5 | 0.3 |
| Type 3 | 20.0 | 2.0 | 1.0 | 1.0 |
| Type 4 | 20.0 | 2.0 | 1.0 | 1.0 |
| Type 5 | 40.0 | 4.0 | 2.0 | 1.5 |
| Type 6 | 40.0 | 4.0 | 2.0 | 1.5 |
| Type 7 | 80.0 | 8.0 | 4.0 | 2.0 |

Figure 7:
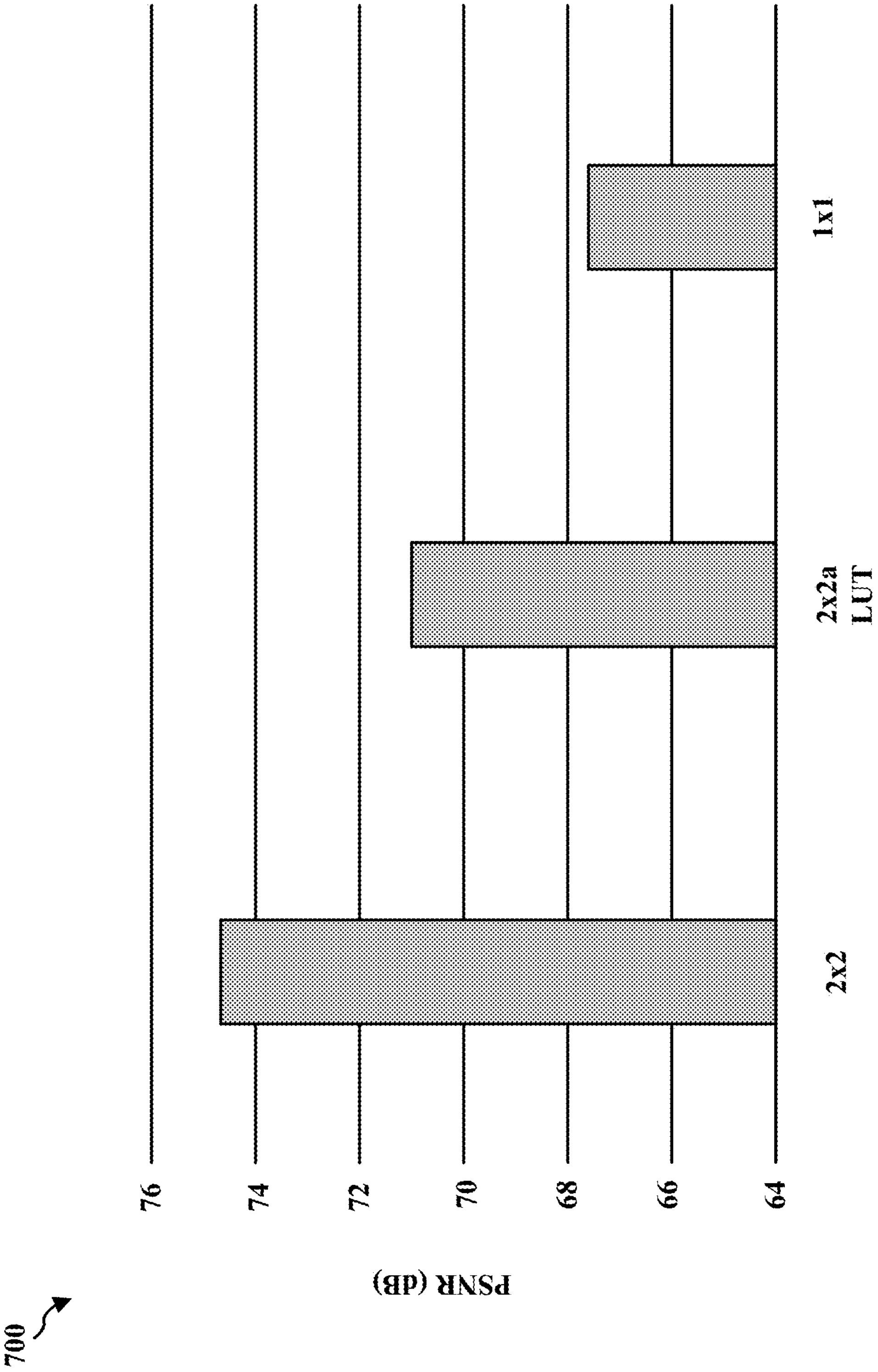
FIG. 7 illustrates an example graph of peak signal-to-noise ratio (PSNR) for different correction surfaces using a subsampling method in accordance with one or more techniques of this disclosure.

FIG. 7 illustrates graph 700 of peak signal-to-noise ratio (PSNR) for different correction surfaces using a subsampling method in accordance with one or more techniques of this disclosure. As shown in FIG. 7, the correction surfaces may correspond to a 2×2 surface, a 2×2a LUT (e.g., an example partition), and a 1×1 surface. FIG. 7 shows a comparison of PSNR for different correction surfaces using suboptimal DSC topology, e.g., PenTile data, DSC v1.1, small slice size [540×12], or 8 bits per-color (bpc)/8 bits per-pixel (bpp). As shown in FIG. 7, the 1×1 block may not be subsampled. FIG. 7 shows that as increased subsampling is performed, the distortion incurred from DSC decreases. So an increased amount of input entropy may result in a corresponding increase in distortion. For instance, as the size of the subpixel block increases, the entropy may continue to decrease, but the quality may likewise suffer.

In some aspects, there may be several valid modifications to the above proposals which yield similar results. For instance, the cost function for a partition type selection may penalize the number of splits in the partition type. However, it may also be accomplished using the variance of the corrections themselves. Also, the LUT determining the penalty for partition splits may be tuned depending on the presence of display stream compression, or the version or bitrate thereof. For example, with the suboptimal DSC v1.1 at 8 bpp, aspects of the present disclosure may be conservative with allowing splits, since distortion due to the codec may be large. In contrast, a DSC v1.2 implementation at 8 bpp may allow for significantly more splitting due to the increased performance of the codec for certain data. The objective function for selecting a partition type may consider the variation of luminance relative to the target within a block as the distortion term. This may be replaced with an alternate statistic, e.g., entropy or range (maximum-minimum).

In some instances, post-corrected measurement surfaces may be captured with a camera, e.g., a demura camera, as color maps may be fixed based on an uncorrected surface. Also, an improvement in panel uniformity may be observed for all AP corrections. While the best uniformity may be observed for 1×1 corrections, this may also be the worst case for DSC artifacts. The 2×2 corrections may show a reduction in DSC artifacts, but may be less uniform due to the reduced resolution of the corrections. Aspects of the present disclosure may utilize an adaptive approach that strikes a balance between the previous two approaches. In some aspects, this may yield the best performance from a visual inspection.

For the above approach, aspects of the present disclosure may utilize a M×N block size (e.g., 3×2, 1×3, etc.). The proposed approach for a 2×2 block can be extended in a straightforward way to block sizes other than 2×2 by modifying the set of partition type and the constituent sub-blocks. In addition to the measured results, correction data may verify that dynamic subsampling may provide a high level of quality. In some instances, aspects of the present disclosure may include a comparison of pre-demura and post-demura luminance surfaces. Surfaces may be captured from a display using command mode, i.e., DSC is employed, and surfaces may be captured from a display using video mode, i.e., DSC is not used. For example, a 1×1 correction surface may have the highest entropy, and therefore a highest prevalence of DSC artifacts in command mode.

Figure 8:
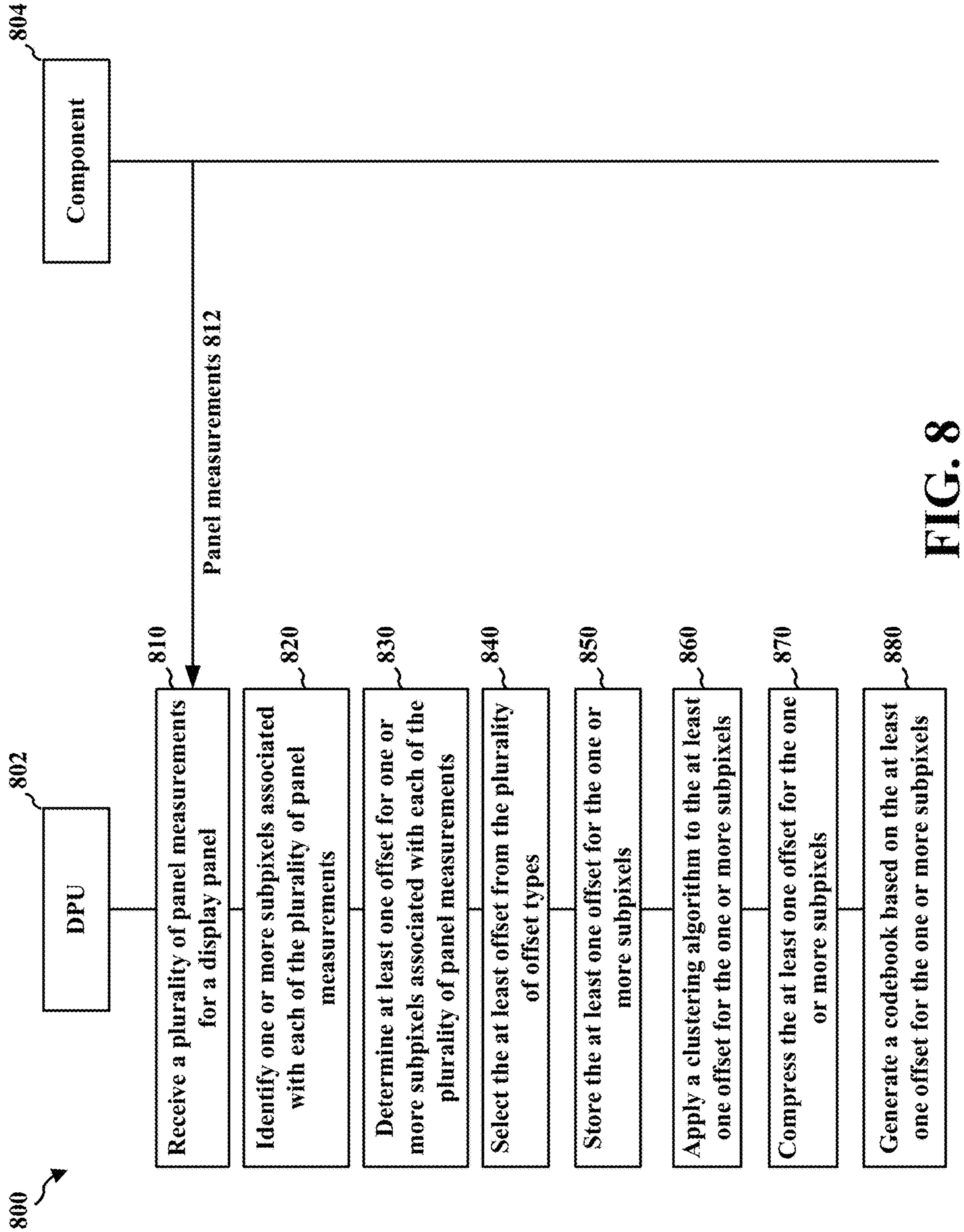
FIG. 8 is a communication flow diagram illustrating example communications between a DPU and a component in accordance with one or more techniques of this disclosure.

FIG. 8 is a communication flow diagram 800 of display processing in accordance with one or more techniques of this disclosure. As shown in FIG. 8, diagram 800 includes example communications between a DPU 802 and a component 804, e.g., a camera, in accordance with one or more techniques of this disclosure.

At 810, DPU 802 may receive a plurality of panel measurements, e.g., panel measurements 812, for a display panel, each of the plurality of panel measurements associated with a plurality of subpixels in the display panel. Each of the panel measurements, e.g., panel measurements 812, may include at least one of one or more color levels or one or more color components. Also, the plurality of panel measurements, e.g., panel measurements 812, may be performed by at least one camera, e.g., component 804, or at least one demura camera.

At 820, DPU 802 may identify the one or more subpixels of the plurality of subpixels associated with each of the plurality of panel measurements, e.g., panel measurements 812.

At 830, DPU 802 may determine, upon receiving the plurality of panel measurements, at least one offset for one or more subpixels of the plurality of subpixels associated with each of the plurality of panel measurements, e.g., panel measurements 812. The one or more subpixels may correspond to an M×N block of subpixels or an M×N grid of subpixels, where M is a number of rows and N is a number of columns. In some aspects, M may be equal to two (2) and N may be equal to two (2), such that the one or more subpixels may correspond to a 2×2 block of subpixels or a 2×2 grid of subpixels. Also, each of the one or more subpixels may be subsampled or dynamically subsampled to determine the at least one offset.

In some instances, the at least one offset may correspond to at least one of a demura offset or a correction factor for a demura surface. Also, the at least one offset may correspond to an absolute difference between a predicted luminance for the one or more subpixels and a target luminance for the one or more subpixels. The at least one offset may be represented by $S_B$, where the at least one offset is determined by:

$$S_B = \underset{\alpha\in A}{\operatorname{argmin}}\left(\left|T - \frac{1}{N}\sum\nolimits_{\beta\in B}(eval(\beta, \alpha))\right|\right),$$

where A represents a set of available offsets, B represents a set of samples within a sub-block of the one or more subpixels, N represents a number of samples within the sub-block of the one or more subpixels, T represents a target luminance for the one or more subpixels, and eval represents a function for estimating a luminance of sample β with offset α.

At 840, DPU 802 may select the at least offset from a plurality of offset types, where the plurality of offset types may correspond to a plurality of partition types for the one or more subpixels, e.g., partition types 610-617. In some aspects, the at least one offset for the one or more subpixels may be determined based on a plurality of offset types. Further, the plurality of offset types may be preselected, preconfigured, or predetermined.

At 850, DPU 802 may store, upon determining the at least one offset for the one or more subpixels, the at least one offset for the one or more subpixels associated with each of the plurality of panel measurements, e.g., panel measurements 812.

At 860, DPU 802 may apply, upon determining the at least one offset for the one or more subpixels, a clustering algorithm to each of the at least one offset for the one or more subpixels.

At 870, DPU 802 may compress, upon determining the at least one offset for the one or more subpixels, the at least one offset for the one or more subpixels associated with each of the plurality of panel measurements, e.g., panel measurements 812.

At 880, DPU 802 may generate, upon determining the at least one offset for the one or more subpixels, a codebook based on the at least one offset for the one or more subpixels.

Figure 9:
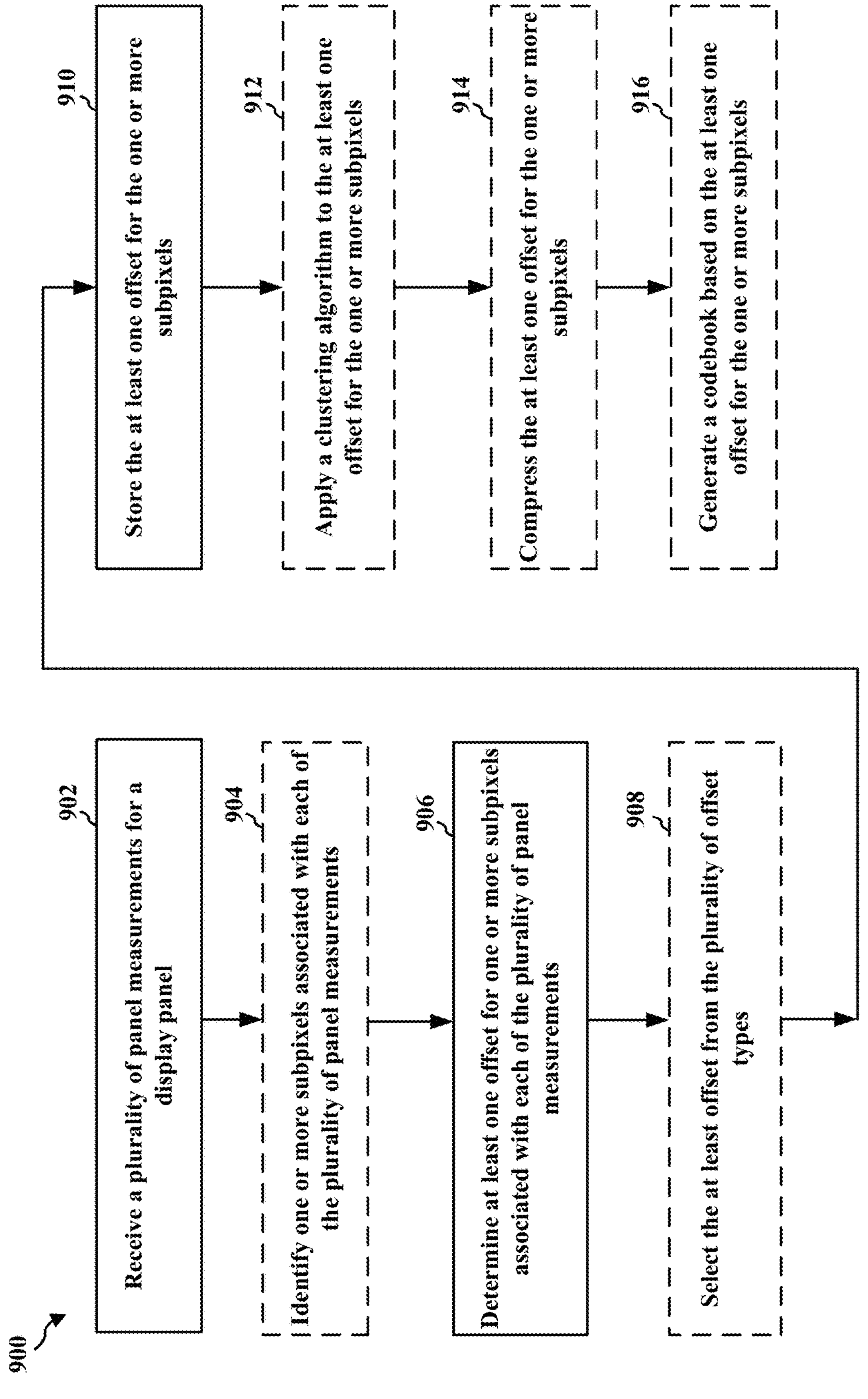
FIG. 9 is a flowchart of an example method of display processing in accordance with one or more techniques of this disclosure.

FIG. 9 is a flowchart 900 of an example method of display processing in accordance with one or more techniques of this disclosure. The method may be performed by an apparatus, such as an apparatus for display processing, a display processing unit (DPU) or other display processor, DPU software, a wireless communication device, and/or any apparatus that can perform display processing as used in connection with the examples of FIGS. 1-8.

At 902, the apparatus may receive a plurality of panel measurements for a display panel, each of the plurality of panel measurements associated with a plurality of subpixels in the display panel, as described in connection with the examples in FIGS. 1-8. For example, DPU 802 may receive a plurality of panel measurements for a display panel, each of the plurality of panel measurements associated with a plurality of subpixels in the display panel. Further, display processor 127 may perform 902. Each of the panel measurements may include at least one of one or more color levels or one or more color components, as described in connection with the examples in FIGS. 1-8. Also, the plurality of panel measurements may be performed by at least one camera or at least one demura camera, as described in connection with the examples in FIGS. 1-8.

At 904, the apparatus may identify the one or more subpixels of the plurality of subpixels associated with each of the plurality of panel measurements, as described in connection with the examples in FIGS. 1-8. For example, DPU 802 may identify the one or more subpixels of the plurality of subpixels associated with each of the plurality of panel measurements. Further, display processor 127 may perform 904.

At 906, the apparatus may determine, upon receiving the plurality of panel measurements, at least one offset for one or more subpixels of the plurality of subpixels associated with each of the plurality of panel measurements, as described in connection with the examples in FIGS. 1-8. For example, DPU 802 may determine, upon receiving the plurality of panel measurements, at least one offset for one or more subpixels of the plurality of subpixels associated with each of the plurality of panel measurements. Further, display processor 127 may perform 906. The one or more subpixels may correspond to an M×N block of subpixels or an M×N grid of subpixels, where M is a number of rows and N is a number of columns, as described in connection with the examples in FIGS. 1-8. In some aspects, M may be equal to two (2) and N may be equal to two (2), such that the one or more subpixels may correspond to a 2×2 block of subpixels or a 2×2 grid of subpixels, as described in connection with the examples in FIGS. 1-8. Also, each of the one or more subpixels may be subsampled or dynamically subsampled to determine the at least one offset, as described in connection with the examples in FIGS. 1-8.

In some instances, the at least one offset may correspond to at least one of a demura offset or a correction factor for a demura surface, as described in connection with the examples in FIGS. 1-8. Also, the at least one offset may correspond to an absolute difference between a predicted luminance for the one or more subpixels and a target luminance for the one or more subpixels, as described in connection with the examples in FIGS. 1-8. The at least one offset may be represented by $S_B$, where the at least one offset is determined by:

$$S_B = \underset{\alpha \in A}{\operatorname{argmin}}\left(\left|T - \frac{1}{N}\sum\nolimits_{\beta \in B}(eval(\beta, \alpha))\right|\right),$$

where A represents a set of available offsets, B represents a set of samples within a sub-block of the one or more subpixels, N represents a number of samples within the sub-block of the one or more subpixels, T represents a target luminance for the one or more subpixels, and eval represents a function for estimating a luminance of sample β with offset α, as described in connection with the examples in FIGS. 1-8.

At 908, the apparatus may select the at least offset from a plurality of offset types, where the plurality of offset types may correspond to a plurality of partition types for the one or more subpixels, as described in connection with the examples in FIGS. 1-8. For example, DPU 802 may select the at least offset from a plurality of offset types, where the plurality of offset types may correspond to a plurality of partition types for the one or more subpixels. Further, display processor 127 may perform 908. In some aspects, the at least one offset for the one or more subpixels may be determined based on a plurality of offset types, as described in connection with the examples in FIGS. 1-8. Further, the plurality of offset types may be preselected, preconfigured, or predetermined, as described in connection with the examples in FIGS. 1-8.

At 910, the apparatus may store, upon determining the at least one offset for the one or more subpixels, the at least one offset for the one or more subpixels associated with each of the plurality of panel measurements, as described in connection with the examples in FIGS. 1-8. For example, DPU 802 may store, upon determining the at least one offset for the one or more subpixels, the at least one offset for the one or more subpixels associated with each of the plurality of panel measurements. Further, display processor 127 may perform 910.

At 912, the apparatus may apply, upon determining the at least one offset for the one or more subpixels, a clustering algorithm to each of the at least one offset for the one or more subpixels, as described in connection with the examples in FIGS. 1-8. For example, DPU 802 may apply, upon determining the at least one offset for the one or more subpixels, a clustering algorithm to each of the at least one offset for the one or more subpixels. Further, display processor 127 may perform 912.

At 914, the apparatus may compress, upon determining the at least one offset for the one or more subpixels, the at least one offset for the one or more subpixels associated with each of the plurality of panel measurements, as described in connection with the examples in FIGS. 1-8. For example, DPU 802 may compress, upon determining the at least one offset for the one or more subpixels, the at least one offset for the one or more subpixels associated with each of the plurality of panel measurements. Further, display processor 127 may perform 914.

At 916, the apparatus may generate, upon determining the at least one offset for the one or more subpixels, a codebook based on the at least one offset for the one or more subpixels, as described in connection with the examples in FIGS. 1-8. For example, DPU 802 may generate, upon determining the at least one offset for the one or more subpixels, a codebook based on the at least one offset for the one or more subpixels. Further, display processor 127 may perform 916.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus may include means for receiving a plurality of panel measurements for a display panel, each of the plurality of panel measurements associated with a plurality of subpixels in the display panel. The apparatus may further include means for determining, upon receiving the plurality of panel measurements, at least one offset for one or more subpixels of the plurality of subpixels associated with each of the plurality of panel measurements. The apparatus may further include means for storing, upon determining the at least one offset for the one or more subpixels, the at least one offset for the one or more subpixels associated with each of the plurality of panel measurements. The apparatus may further include means for selecting the at least offset from the plurality of offset types, where the plurality of offset types corresponds to a plurality of partition types for the one or more subpixels. The apparatus may further include means for identifying the one or more subpixels of the plurality of subpixels associated with each of the plurality of panel measurements. The apparatus may further include means for applying, upon determining the at least one offset for the one or more subpixels, a clustering algorithm to each of the at least one offset for the one or more subpixels. The apparatus may further include means for compressing, upon determining the at least one offset for the one or more subpixels, the at least one offset for the one or more subpixels associated with each of the plurality of panel measurements. The apparatus may further include means for generating, upon determining the at least one offset for the one or more subpixels, a codebook based on the at least one offset for the one or more subpixels.

The subject matter described herein can be implemented to realize one or more benefits or advantages. For instance, the described graphics processing techniques can be used by a DPU, a display processor, or some other processor that can perform display processing to implement the adaptive subsampling techniques described herein. This can also be accomplished at a low cost compared to other display processing techniques. Moreover, the display processing techniques herein can improve or speed up data processing or execution. Further, the display processing techniques herein can improve resource or data utilization and/or resource efficiency. Additionally, aspects of the present disclosure can utilize adaptive subsampling techniques in order to improve demura corrections and/or reduce performance overhead.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of display processing. The method includes receiving a plurality of panel measurements for a display panel, each of the plurality of panel measurements associated with a plurality of subpixels in the display panel; determining, upon receiving the plurality of panel measurements, at least one offset for one or more subpixels of the plurality of subpixels associated with each of the plurality of panel measurements; and storing, upon determining the at least one offset for the one or more subpixels, the at least one offset for the one or more subpixels associated with each of the plurality of panel measurements.

Aspect 2 is the method of aspect 1, where the one or more subpixels correspond to an M×N block of subpixels or an M×N grid of subpixels, where M is a number of rows and N is a number of columns.

Aspect 3 is the method of any of aspects 1 and 2, where M is equal to two (2) and N is equal to two (2), such that the one or more subpixels correspond to a 2×2 block of subpixels or a 2×2 grid of subpixels.

Aspect 4 is the method of any of aspects 1 to 3, where each of the one or more subpixels are subsampled or dynamically subsampled to determine the at least one offset.

Aspect 5 is the method of any of aspects 1 to 4, where the at least one offset corresponds to at least one of a demura offset or a correction factor for a demura surface.

Aspect 6 is the method of any of aspects 1 to 5, where the at least one offset corresponds to an absolute difference between a predicted luminance for the one or more subpixels and a target luminance for the one or more subpixels.

Aspect 7 is the method of any of aspects 1 to 6, where the at least one offset is represented by $S_B$, where the at least one offset is determined by:

$$S_B = \underset{\alpha \in A}{\operatorname{argmin}}\left(\left|T - \frac{1}{N}\sum_{\beta \in B}(eval(\beta, \alpha))\right|\right),$$

where A represents a set of available offsets, B represents a set of samples within a sub-block of the one or more subpixels, N represents a number of samples within the sub-block of the one or more subpixels, T represents a target luminance for the one or more subpixels, and eval represents a function for estimating a luminance of sample β with offset α.

Aspect 8 is the method of any of aspects 1 to 7, where the at least one offset for the one or more subpixels is determined based on a plurality of offset types.

Aspect 9 is the method of any of aspects 1 to 8, further including selecting the at least offset from the plurality of offset types, where the plurality of offset types corresponds to a plurality of partition types for the one or more subpixels.

Aspect 10 is the method of any of aspects 1 to 9, where the plurality of offset types is preselected, preconfigured, or predetermined.

Aspect 11 is the method of any of aspects 1 to 10, further including identifying the one or more subpixels of the plurality of subpixels associated with each of the plurality of panel measurements.

Aspect 12 is the method of any of aspects 1 to 11, where each of the panel measurements include at least one of one or more color levels or one or more color components.

Aspect 13 is the method of any of aspects 1 to 12, where the plurality of panel measurements is performed by at least one camera or at least one demura camera.

Aspect 14 is the method of any of aspects 1 to 13, further including applying, upon determining the at least one offset for the one or more subpixels, a clustering algorithm to each of the at least one offset for the one or more subpixels.

Aspect 15 is the method of any of aspects 1 to 14, further including compressing, upon determining the at least one offset for the one or more subpixels, the at least one offset for the one or more subpixels associated with each of the plurality of panel measurements.

Aspect 16 is the method of any of aspects 1 to 15, further including generating, upon determining the at least one offset for the one or more subpixels, a codebook based on the at least one offset for the one or more subpixels.

Aspect 17 is an apparatus for display processing including at least one processor coupled to a memory and configured to implement a method as in any of aspects 1 to 16.

Aspect 18 is an apparatus for display processing including means for implementing a method as in any of aspects 1 to 16.

Aspect 19 is a computer-readable medium storing computer executable code, the code when executed by at least one processor causes the at least one processor to implement a method as in any of aspects 1 to 16.

What is claimed is:

1. A method of display processing, comprising:

receiving a plurality of panel measurements for a display panel, each of the plurality of panel measurements associated with a plurality of subpixels in the display panel;

determining, upon receiving the plurality of panel measurements, at least one offset for one or more subpixels of the plurality of subpixels associated with each of the plurality of panel measurements; and storing, upon determining the at least one offset for the one or more subpixels, the at least one offset for the one or more subpixels associated with each of the plurality of panel measurements, wherein the at least one offset is represented by $S_B$, where the at least one offset is determined by:

$$S_B = \operatorname*{argmin}_{\alpha \in A}\left(\left|T - \frac{1}{N}\sum\nolimits_{\beta \in B}(eval(\beta, \alpha))\right|\right),$$

where A represents a set of available offsets, B represents a set of samples within a sub-block of the one or more subpixels, N represents a number of samples within the sub-block of the one or more subpixels, T represents a target luminance for the one or more subpixels, and eval represents a function for estimating a luminance of sample β with offset α.

2. The method of claim 1, wherein the one or more subpixels correspond to an M×N block of subpixels or an M×N grid of subpixels, where M is a number of rows and N is a number of columns.

3. The method of claim 2, wherein M is equal to two (2) and N is equal to two (2), such that the one or more subpixels correspond to a 2×2 block of subpixels or a 2×2 grid of subpixels.

4. The method of claim 1, wherein each of the one or more subpixels are subsampled or dynamically subsampled to determine the at least one offset.

5. The method of claim 1, wherein the at least one offset corresponds to at least one of a demura offset or a correction factor for a demura surface.

6. The method of claim 1, wherein the at least one offset corresponds to an absolute difference between a predicted luminance for the one or more subpixels and a target luminance for the one or more subpixels.

7. The method of claim 1, wherein the at least one offset for the one or more subpixels is determined based on a plurality of offset types.

8. The method of claim 7, further comprising:

selecting the at least offset from the plurality of offset types, wherein the plurality of offset types corresponds to a plurality of partition types for the one or more subpixels.

9. The method of claim 7, wherein the plurality of offset types is preselected, preconfigured, or predetermined.

10. The method of claim 1, further comprising:

identifying the one or more subpixels of the plurality of subpixels associated with each of the plurality of panel measurements.

11. The method of claim 1, wherein each of the panel measurements include at least one of one or more color levels or one or more color components.

12. The method of claim 1, wherein the plurality of panel measurements is performed by at least one camera or at least one demura camera.

13. The method of claim 1, further comprising:

applying, upon determining the at least one offset for the one or more subpixels, a clustering algorithm to each of the at least one offset for the one or more subpixels.

14. The method of claim 1, further comprising:

compressing, upon determining the at least one offset for the one or more subpixels, the at least one offset for the one or more subpixels associated with each of the plurality of panel measurements.

15. The method of claim 1, further comprising:

generating, upon determining the at least one offset for the one or more subpixels, a codebook based on the at least one offset for the one or more subpixels.

16. An apparatus for display processing, comprising:

a memory; and at least one processor coupled to the memory and configured to:

receive a plurality of panel measurements for a display panel, each of the plurality of panel measurements associated with a plurality of subpixels in the display panel;

determine, upon receiving the plurality of panel measurements, at least one offset for one or more subpixels of the plurality of subpixels associated with each of the plurality of panel measurements; and store, upon determining the at least one offset for the one or more subpixels, the at least one offset for the one or more subpixels associated with each of the plurality of panel measurements, wherein the at least one offset is represented by $S_B$, where the at least one offset is determined by:

$$S_B = \operatorname*{argmin}_{\alpha \in A}\left(\left|T - \frac{1}{N}\sum\nolimits_{\beta \in B}(eval(\beta, \alpha))\right|\right),$$

where A represents a set of available offsets, B represents a set of samples within a sub-block of the one or more subpixels, N represents a number of samples within the sub-block of the one or more subpixels, T represents a target luminance for the one or more subpixels, and eval represents a function for estimating a luminance of sample β with offset α.

17. The apparatus of claim 16, wherein the one or more subpixels correspond to an M×N block of subpixels or an M×N grid of subpixels, where M is a number of rows and N is a number of columns.

18. The apparatus of claim 17, wherein M is equal to two (2) and N is equal to two (2), such that the one or more subpixels correspond to a 2×2 block of subpixels or a 2×2 grid of subpixels.

19. The apparatus of claim 16, wherein each of the one or more subpixels are subsampled or dynamically subsampled to determine the at least one offset.

20. The apparatus of claim 16, wherein the at least one offset corresponds to at least one of a demura offset or a correction factor for a demura surface.

21. The apparatus of claim 16, wherein the at least one offset corresponds to an absolute difference between a predicted luminance for the one or more subpixels and a target luminance for the one or more subpixels.

22. The apparatus of claim 16, wherein the at least one offset for the one or more subpixels is determined based on a plurality of offset types.

23. The apparatus of claim 22, wherein the at least one processor is further configured to:

select the at least offset from the plurality of offset types, wherein the plurality of offset types corresponds to a plurality of partition types for the one or more subpixels.

24. The apparatus of claim 22, wherein the plurality of offset types is preselected, preconfigured, or predetermined.

25. The apparatus of claim 16, wherein the at least one processor is further configured to:

identify the one or more subpixels of the plurality of subpixels associated with each of the plurality of panel measurements.

26. The apparatus of claim 16, wherein each of the panel measurements include at least one of one or more color levels or one or more color components.

27. The apparatus of claim 16, wherein the plurality of panel measurements is performed by at least one camera or at least one demura camera.

28. The apparatus of claim 16, wherein the at least one processor is further configured to:

apply, upon determining the at least one offset for the one or more subpixels, a clustering algorithm to each of the at least one offset for the one or more subpixels.

29. The apparatus of claim 16, wherein the at least one processor is further configured to:

compress, upon determining the at least one offset for the one or more subpixels, the at least one offset for the one or more subpixels associated with each of the plurality of panel measurements.

30. The apparatus of claim 16, wherein the at least one processor is further configured to:

generate, upon determining the at least one offset for the one or more subpixels, a codebook based on the at least one offset for the one or more subpixels.

31. An apparatus for display processing, comprising:

means for receiving a plurality of panel measurements for a display panel, each of the plurality of panel measurements associated with a plurality of subpixels in the display panel;

means for determining, upon receiving the plurality of panel measurements, at least one offset for one or more subpixels of the plurality of subpixels associated with each of the plurality of panel measurements; and means for storing, upon determining the at least one offset for the one or more subpixels, the at least one offset for the one or more subpixels associated with each of the plurality of panel measurements, wherein the at least one offset is represented by $S_B$, where the at least one offset is determined by:

$$S_B = \underset{\alpha \in A}{\operatorname{argmin}}\left(\left|T - \frac{1}{N}\sum\nolimits_{\beta \in B}(eval(\beta, \alpha))\right|\right),$$

where A represents a set of available offsets, B represents a set of samples within a sub-block of the one or more subpixels, N represents a number of samples within the sub-block of the one or more subpixels, T represents a target luminance for the one or more subpixels, and eval represents a function for estimating a luminance of sample $\beta$ with offset $\alpha$.

* * * * *